Aug. 10, 1948.　　　C. S. ROOT　　　2,446,850
RADIO ECHO APPARATUS
Filed Nov. 30, 1942　　　2 Sheets-Sheet 1

Inventor:
Charles S. Root,
by Harry E. Dunham
His Attorney.

Patented Aug. 10, 1948

2,446,850

UNITED STATES PATENT OFFICE 2,446,850

RADIO ECHO APPARATUS

Charles S. Root, Bridgeport, Conn., assignor to General Electric Company, a corporation of New York Application November 30, 1942, Serial No. 467,297

11 Claims. (Cl. 343—13)

My invention relates to radio echo apparatus and more particularly to the class of radio echo apparatus in which periodic pulses are radiated and corresponding pulses are thereafter received, either by reason of reflection from remote objects or by reason of operation of apparatus on such remote objects, the received pulses, or echoes, being then displayed upon the viewing screen of a cathode ray device. Such apparatus may be employed to determine the distance, direction or height of such remote objects or the identity thereof.

My invention relates more particularly to the method of display of said pulses on the viewing screen of the cathode ray device and it has for its object to effect certain improvements therein.

Commonly, in such apparatus, the received pulses are displayed on the viewing screen at a position corresponding to the distance to the remote object producing the respective pulse. Where the pulses are received in two, or more, differently located receiving means, as where height or direction is to be determined, the pulses received in the different receiving means may be displayed either at the same position on the screen, or at different positions, preferably side by side, thereby to permit comparison of intensities of the pulses as received in the differently located receiving means. Such comparison may be taken as a criterion of direction to the remote object or the height thereof.

An object of my invention is to provide improved means for securing this type of display of the pulses on the viewing screen.

A further object of my invention is to provide display means whereby the pulses received in two different receiving means may be displayed either at the same position or at respective different positions on the viewing screen but in which the display of pulses received in one receiving means is not changed in position by change in position of the display of pulses received in another of said receiving means.

Figure 1:
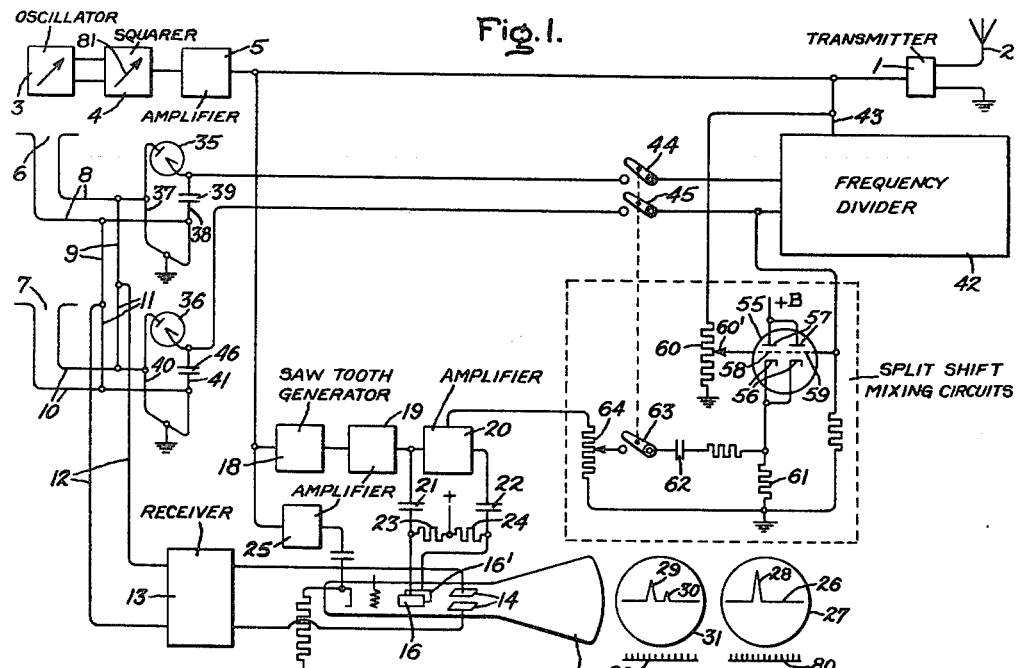
Figure 2:
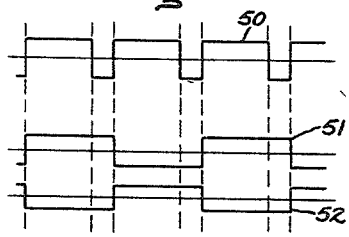
Figure 3:
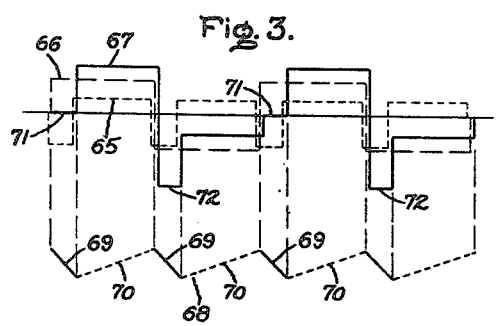
Figure 4:
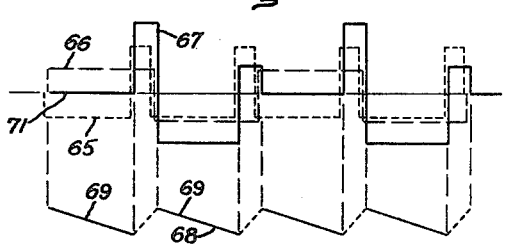
Figure 5:
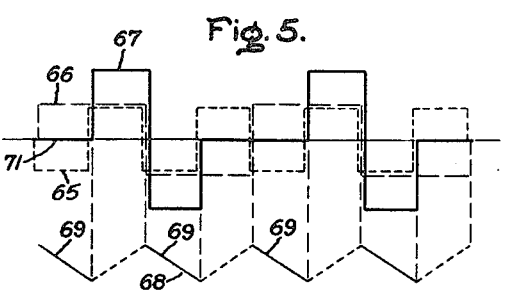
Figure 6:
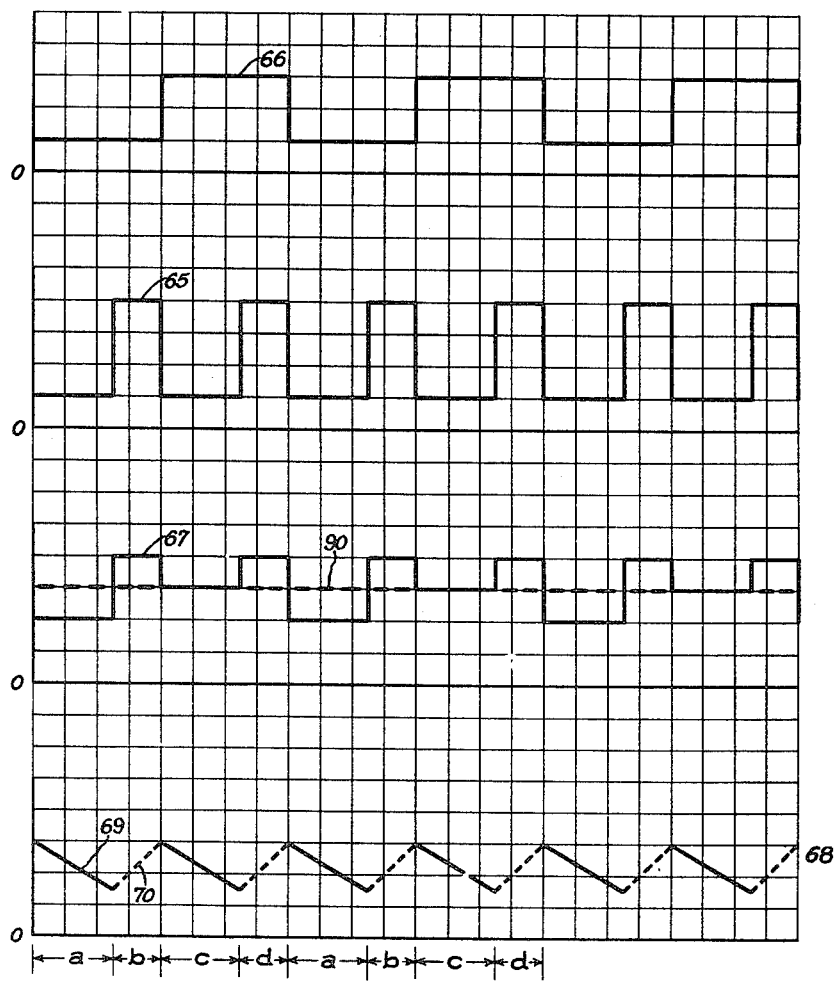

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Fig. 1 represents an embodiment of my invention; Fig. 2 represents certain characteristics thereof; Fig. 3 represents certain operational effects secured as a result of my invention; and Figs. 4, 5, and 6 represent additional characteristics thereof.

Referring to Fig. 1 of the drawing I have indicated at 1 a pulse transmitter having an antenna 2 which may be arranged to radiate pulses into space. This antenna is shown conventionally, as one of nondirective type, but may be one of the highly directive type capable of orientation in any desired direction. The pulses radiated thereby may be of a desired frequency, as, for example, 60 cycles per second, determined by the frequency of an oscillator 3. This oscillator may be one of any conventional type, the oscillations of which are supplied through a squarer 4 and an amplifier 5 to the transmitter 1 where they are used to synchronize the outgoing pulses.

These radiated pulses of course travel through space and may impinge upon a reflecting surface whereby they are reflected and thereafter received in receiving antennae 6 and 7. They may also be intercepted by remote reception apparatus, which may, for example, be carried by a remote airplane, and corresponding pulses radiated into space from such airplane and received in the antennae 6 and 7. I refer herein, and in the appended claims, to such received pulses as echoes of the radiated pulses whether they be received by reason of reflection from remote objects or by reason of operation of apparatus located on such remote objects.

The pulses received in the antennae 6 and 7 are supplied through transmission lines 8 and 9 in the case of the antenna 6, and 10 and 11 in the case of the antenna 7, to a common transmission line 12 leading to a receiver 13 whereby such pulses are rectified and supplied to the vertical deflection plates 14 of a cathode ray device 15.

This cathode ray device is also provided with horizontal deflection plates 16 and 16' between which voltage is impressed to sweep the ray of the cathode ray device across the screen horizontally and synchronously with the outgoing pulses. This voltage may be of sawtooth wave form and, as illustrated in the drawing, is generated by means of a sawtooth wave generator 18, which operates to integrate the square wave received from the amplifier 5 to produce the sawtooth wave, the latter being amplified in amplifiers 19 and 20. The output from the amplifier 20 is of opposite phase from the output from the amplifier 19, and accordingly these two outputs are supplied through condensers 21 and 22, respectively, to the different plates 16 and 16', whereby these plates are supplied with equal and oppositely varying voltages with respect to ground. These plates are connected through resistances 23 and 24, respectively, to the positive terminal of a source of operating potential indicated by the plus sign shown on the drawing and the negative terminal of which may be connected to ground or to the cathode of the cathode ray device. In this way, after each radiated pulse, the cathode ray of the device is deflected horizontally across the screen of the cathode ray device, as indicated by the horizontal line 26 shown in the circle 27 at the right of the cathode ray device 15. The square wave from amplifier 5 is also supplied through amplifier 25 either to the cathode or the control electrode of device 15, as desired, to interrupt the ray during the retrace interval.

Pulses received in the antennae 6 and 7 and impressed upon the vertical deflection plates 14 cause a vertical deflection of the cathode ray, as indicated at 28 in the circle 27. This vertical deflection of course appears at a position in the horizontal line 26 corresponding to the time when the received pulses arrive, and hence, it appears at a position corresponding to the distance to the remote reflecting surface or object from which the received pulses were received. Since this indication 28 is produced by the combined effects of the received pulses in antennae 6 and 7, its height is dependent upon the combined intensities of the received pulses.

The antennae 6 and 7 may likewise be highly directive and, if the antenna 2 be arranged for variable orientation, these antennae 6 and 7 may be arranged for variable orientation and for agreement in orientation with the antenna 2. Means whereby such variable orientation is obtained are not described here since they form no part of my present invention. The antennae 6 and 7, however, may be arranged at different elevations, as, for example, one above the other in the same plane. When so arranged, particularly over a large level area of earth, the ratio of the intensities of the pulses received in the different antennae 6 and 7 is dependent upon the elevation angle from which they are received and thus is a criterion of the height of the remote source from which they are received, that is, the remote reflecting surface, or the remote apparatus responding to the radiated pulses. Accordingly, it is desired that the pulses received in the antennae 6 and 7 be separately displayed upon the screen of the cathode ray device, thereby to produce effects such as those indicated at 29 and 30 in the circle 31 at the right of the cathode ray device 15 on the drawing. In this circle 31, the vertical deflection 29 may be produced by a pulse received from the antenna 6, and the vertical deflection 30 may be produced by a pulse from the antenna 7, the ratio of the heights of the two pulses being a criterion of the height of the remote object, which may be, for example, a remote aircraft.

The deflections 29 and 30 are smaller than the deflection 28 and have heights corresponding to the intensities of the pulses as received in the different antennae. The height of deflection 28 is the sum of the heights of deflections 29 and 30.

To accomplish the separation of the display, or "split," as it is often called, of the two pulses, diodes 35 and 36 are provided and are operated when switches 44, 45 and 63, which can be arranged for unicontrol, are closed. The diode 35 has its anode connected to ground through a conductor 37 and its cathode connected to ground through a conductor 38, which includes a condenser 39. Each of the conductors 37 and 38 has a length equal to a quarter of a wave length of the frequency of the carrier wave of the pulses. The opposite conductors of the transmission line 8 are connected to these conductors 37 and 38 at such points that high impedance exists therebetween when the diode is nonconducting, and very low impedance, amounting, practically, to a short circuit, exists therebetween when the diode is conducting. The diode 36 is similarly connected by means of conductors 40 and 41 so that the line 10 is effectively short circuited when the diode 36 is conducting and has high impedance thereacross when the diode is non-conducting. Each of the lines 9 and 11 has a length equal to a quarter of a wave length of the carrier wave so that a short circuit produced on either line 8 or 10 by the respective diode 35 or 36 does not affect reception from the other antenna.

These diodes 35 and 36 are rendered alternately conducting thereby alternately to disable the antennae 6 and 7. In this way the echo of one radiated pulse is received from the antenna 6 and the echo of the next radiated pulse is received from the antenna 7, etc. The means whereby this is effected comprises the frequency divider 42 to which the square wave from the output of the amplifier 5 is supplied over conductor 43. This frequency divider operates to produce two further square waves of equal half cycles and each having half of the frequency of the waves supplied thereto and which are of opposite phase. One of these waves is supplied through switch 44 to the cathode of diode 35 and the other is supplied through switch 45 to the cathode of the diode 36. In this way, these cathodes are made alternately negative with respect to ground thereby to render the diodes alternately conducting. The condensers 39 and 46 have high impedance to these half frequency square waves and prevent short circuiting of the conductors extending through the switches 44 and 45.

The operation of this part of the equipment is better illustrated in Fig. 2, in which the square wave at the output of the amplifier 5 may be as represented by the curve 50. The square wave supplied through switch 44 may be as indicated by the curve 51, and the square wave supplied through the switch 45 may be as indicated by the curve 52. Each diode is conducting during the negative portion of the square wave supplied to its respective cathode and thus the diodes are alternately conducting and the antennae 6 and 7 alternately operative to receive pulses and to supply the received pulses to the cathode ray device.

In accordance with my invention means are also provided whereby a further horizontal deflection of the cathode ray is effected during the period of reception by one only of the two antennae thereby to display the pulse received in the particular antenna at a different position on the screen from that at which the pulses received in the other antenna are displayed. This means is of such character that it has no inherent tendency to shift undesirably the display of pulses received from said other antenna.

This means comprises the discharge device 55. This device suitably may comprise a pair of triodes but which, as illustrated, are arranged in a single envelope having cathodes 56, anodes 57 and control electrodes 58 and 59, respectively. The square wave from the amplifier 5 is supplied across resistance 60, which has a variable tap 60' connected to the control electrode 58. The square wave supplied through switch 45 to the diode 36 is also supplied to the control electrode 59. These two square waves control the current flowing through these triodes and through resistance 61 connected between the two cathodes and ground. The potential on this resistance is then supplied through condenser 62 and the switch 63 to a resistance 64 and thence to the amplifier 20. This potential may, for example, be supplied to the amplifier 20 in any suitable way, as to the control electrode or in series with the anode operating voltage of the amplifier. If supplied in series with the anode operating voltage, it increases the anode voltage on that device during the periods of reception from one of the antennae, and hence it increases the voltage on the corresponding one 16' of the two deflection plates 16, 16' of the cathode ray device. This increased voltage on plate 16' deflects the beam horizontally, as to the right, thus shifting the deflection produced by pulses received in one antenna to the right of the deflection produced by pulses received in the other antenna.

The manner in which the two square waves supplied to the discharge device 55 combine is represented in Fig. 3. In Fig. 3 the curve 65, which is similar to the curve 50 of Fig. 2, represents the square wave supplied over conductor 43 to the frequency divider. The curve 66 represents the square wave having half the frequency of the wave represented by the curve 65 and which represents the wave supplied through switch 45 to the diode 36, for example. These two waves 65 and 66 combine on the resistance 61 to produce a wave represented by the full line 67. To avoid confusion of these curves they have been drawn with their corresponding vertical portions non-coincident, although these vertical portions occur simultaneously with respect to time.

The sawtooth wave supplied to the amplifier 20 is indicated in Fig. 3 by the curve 68, the full line portions 69 thereof corresponding to the time when the ray is deflected to the right across the screen of the cathode ray device. The dotted line portion 70 of this curve represents the flyback interval when the ray is returned to the left to its starting position.

During the first interval 69 illustrated at the left end of the curve 68 of Fig. 3, the curve 67 is of zero value, as indicated at 71; that is, the instantaneous intensity of wave 66 is equal and opposite to that of wave 65. This equality may be obtained by proper adjustment of the variable contact 60' on resistance 60. Thus this wave 67 does not affect the voltage on the plate 16' of the cathode ray device during this interval. During the second interval 69 of the sawtooth wave 68, the wave 67 has a finite negative value, as indicated at 72, and thus materially changes the voltage applied to the plate 16'. During the next sweep interval 69 of the wave 68, the curve 67 is again of zero value, as indicated at 71, and during the subsequent interval it is again of negative value, as indicated at 72.

During the intervals when the curve 67 is of zero value, as indicated at 71, reception is had from the antenna 7 and the received pulses are displayed at the position 29, which is the same position at which they are displayed when both antennae are operating. During the intervals 72, when reception is had from the antenna 6, the display occurs at the point 30 shifted to the right from the point 29. Thus the two deflections 29 and 30 represent respectively the intensity of the pulses received from the antennae 6 and 7 and their relative heights form a criterion from which the height of the remote aircraft may be determined.

It will now be seen that if the switches 44, 45 and 63, which are unicontrolled, are all in their open position, then reception is had simultaneously from the two antennae 6 and 7 and the indication is that represented at 28 in the circle 27, whereas with the switches 44, 45 and 63 closed the indication is that represented at 29 and 30 in the circle 31.

It is particularly important, however, in the operation of such equipment that the display of the pulses 29 received from one of the antennae when the switches are closed be precisely in the same position at which the pulses from the two antennae are displaced when these switches are open. This is desirable since it permits the position of this particular deflection to be used as a criterion of the distance to the remote object irrespective of whether the two antennae are operating simultaneously or alternately. Thus the distance to the remote object, if the switches are closed, is determined by the position of the left hand vertical deflection 29 upon the scale 80 which may be associated with the viewing screen of the cathode ray device. If the switches are open, it is determined by the position of the deflection 28 upon the scale 80, these two positions being exactly coincident. By producing the separation of the two deflections 29 and 30 in the manner explained in connection with Fig. 3, any shift of the position of display of the pulses corresponding to the deflection 29 is avoided. Thus the effect which has been observed in certain apparatus of the prior art in which, when the two deflections 29 and 30 are separated, one shifts to the left and the other to the right, is avoided and thus the determination of distance is facilitated being always determined by the left hand one of the two vertical deflections.

If a simple square wave voltage be supplied to the amplifier 20 to produce the split response described by reference to the circle 31, the undesired opposite shifting of the two vertical deflections results. This is because the resultant wave is supplied to the plate 16' through a condenser 22. The voltage on plate 16' thus varies equally about an average value, varying from the average value during one half cycle in one direction and during the other half cycle in the other direction. Thus the separation results from shifting both deflections, one to the left and the other to the right. This undesired effect is avoided in my invention since the value 71 is adjusted to be exactly equal to the average value of wave 67 and thus to be exactly equal to zero when the wave 67 has passed through condenser 22.

In the operation of equipment such as that described it is desirable that the period of the negative portion of the square wave produced by the squarer 4 be variable, as indicated by the arrow 81 in rectangle 4 of Fig. 1. Figs. 4 and 5 show the manner in which these different waves combine when the period of the negative portion of this wave is varied. In Fig. 4 the wave 65 again represents that produced by the squarer 4 but which has a long negative portion relative to its positive portion. The half frequency wave 66 in Fig. 4 is again of the form indicated in Fig. 3 and the resultant wave is of the form indicated by the curve 67 in Fig. 4. Of course, the change in the shape of the square wave produced by the squarer 4 also changes the duration of the sweep period 69 of the sawtooth wave 68 and the result is the same as before; that is, during the first sweep 69 the wave 67 is of zero value, during the second sweep the wave 67 has a finite negative value, during the third sweep it is again of zero value, etc.

Fig. 5 is similar to Figs. 3 and 4 except that it illustrates the condition when the square wave 65 has exactly equal positive and negative portions. Under this condition, again, the wave 67 is of zero value during the first sweep 69, of negative value during the second sweep 69, and again of zero value during the third sweep 69, etc.

In all three figures, Figs. 3, 4 and 5, it will be noted that value 71 is adjusted to be equal to the average value of wave 67 over a complete cycle of wave 67 merely by making the area under the positive portions of wave 67 equal to the area under the negative portions of wave 67 over a complete repetition cycle of recurrent wave 67.

In all of Figs. 3, 4 and 5 it is assumed that the values of voltages of the waves 65 and 66 applied to the control electrodes 58 and 59 respectively are not of such value that either of these waves produces sufficient current in resistance 61 to cut off the opposite discharge device thereby preventing the other wave, or a portion thereof, from affecting the voltage on resistance 61. The circuit is effective for the purposes described, however, even though the positive portion of one or both of these waves is sufficiently great to produce sufficient voltage on the resistance 61 to cut off the other device. This operation is illustrated in Fig. 6.

In Fig. 6 I have illustrated voltage waves 65 and 66 in the same form as the corresponding waves of Fig. 4 but each is drawn to represent variations of voltage with respect to a respective zero voltage axis. The more positive portion of both of these waves 65 and 66 is assumed to be great enough to produce cut off of the opposite discharge device. The resultant curve of voltage on resistance 61 is represented at 67.

During the time interval $a$, both curves 65 and 66 are at their low voltage values and the curve 67 has a value equal to the sum thereof during this interval.

During the interval $b$, the voltage of wave 65 is greater than that of wave 66 and cuts off the current in the other device. Thus wave 66 does not affect the voltage on resistance 61 during this interval and the voltage of curve 67 during this interval is equal to the value of wave 65.

During interval $c$, the voltage of wave 66 is greater than that of wave 65 and cuts off the current in the device to which wave 65 is applied. Wave 65 therefore does not affect the voltage on resistance 61, and the voltage on resistance 61 is equal to that of wave 66.

During interval $d$, conditions are again the same as in interval $b$.

Thereafter this cycle of operations repeats continuously.

The values of the wave 67 during intervals $b$ and $d$ are determined by wave 65 and therefore are adjustable by adjustment of potentiometer contact 60'. Similarly the values of wave 67 during intervals $a$ is the sum of waves 65 and 66 during this interval and is adjustable by contact 60'. The value of wave 67 during interval $c$, however, is determined by wave 66 and is therefore not affected by adjustment of contact 60', and thus remains fixed during adjustment of that contact. Contact 60' may then be adjusted to such a position that the areas of wave 67 above the dotted line 90, corresponding to the value of wave 67 during interval $c$, are equal to the area of that curve below line 90 and the desired effect is achieved. That is, the curve 67 may be transmitted through the condensers 21 and 22 to the deflection plate as a wave balanced about the axis 90. During the deflection interval $c$, this wave has zero voltage and no shift of the cathode ray occurs. During the deflection interval $a$, this wave has a substantial value and the cathode ray is shifted as desired. Thus the desired split effect obtains as described under the previously assumed conditions.

This condition also obtains if waves 65 and 66 have the forms indicated in Figs. 3 and 5.

While I have shown a particular embodiment of my invention, I do not wish to be limited thereto since different modifications both in the circuit arrangement and in the instrumentalities employed may be made, and I contemplate by the appended claims to cover any such modifications as fall within the true spirit and scope of my invention.

What I claim as new and desire to secure by Letters Patent of the United States is:

1. In combination, a cathode ray device having a viewing screen, means to transmit periodic pulses and to deflect the ray of said device over a predetermined path across said screen during a predetermined interval after each transmitted pulse, two means to receive alternately radio pulses occurring at equal periods after each of said transmitted pulses and to supply said pulses to said cathode ray device to control said ray thereby to produce a visible effect upon said screen at a point along said path, and means to render said visible effects produced by said two receiving means either at the same position on said path or at two separate respective positions on said path, one of which two positions is the same position as said first mentioned position in which said two effects are rendered.

2. In combination, a cathode ray device having a viewing screen, means to transmit periodic pulses and to deflect said ray across said screen during a predetermined interval after each transmitted pulse, a plurality of means to receive echoes of said transmitted pulses and to control said ray in accordance therewith thereby to produce a visible effect on said screen at a position corresponding to the time when said echoes are received, whereby periodic echo pulses of the same frequency received simultaneously from the same distance in said different receiving means produce effects at the same position on said screen, and means to displace on said screen the effect produced by said periodic echo pulses received in one of said means while the effect of said periodic echo pulses received in another of said means remains stationary on said screen.

3. The combination, in a radio echo apparatus, of means to radiate pulses, a plurality of means to receive echoes thereof, a viewing screen, means to produce on said viewing screen an indication of said echoes at a position in the width of said screen corresponding to the interval of time between radiation and reception thereof, and means to displace in the direction along said width of said screen the indication of said echoes received in one of said echo receiving means while maintaining stationary the position of the indication produced by echoes received in another of said echo receiving means whereby echoes received from the same distance in said two means appear side by side along the direction of said width.

4. The combination, in a radio echo apparatus, of means to radiate pulses, a plurality of means to receive echoes thereof, a viewing screen, means to produce on said viewing screen an indication of said echoes at a position along one dimension of said screen corresponding to the interval of time between radiation and reception thereof, said indication being of magnitude dependent upon the combined intensity of the echoes indicated thereby, and means to displace along said dimension of said screen the indication of echoes received in one of said echo receiving means while maintaining stationary the indication of echoes received in another of said echo receiving means, whereby distance to the remote body from which said echoes are received may be determined by the position of said stationary indication and the relative intensity of echoes received in different of said receiving means may be determined by comparison of said displaced indication with said stationary indicaton.

5. The combination, in a radio echo apparatus, of a plurality of antennae, means to radiate periodic pulses and to receive echoes thereof in said antennae, said antennae being arranged to be simultaneously affected by echoes of any of said radiated pulses, a viewing screen, means to produce an indication on said screen of the echoes received in said antennae, said indication having a magnitude dependent upon the combined intensities of said echoes as received in said antennae, and means to receive echoes of alternate pulses in different of said antennae, and to displace on said screen the indication of said echoes received in one of said antennae while maintaining the indication of the echo received in the other of said antennae fixed in position, whereby two indications appear on said screen, one of which is at the position of said first mentioned indication and both of which are smaller than said first mentioned indication.

6. The combination, in an echo apparatus, of means to radiate periodic pulses, a plurality of antennae, means to render said antennae operative either simultaneously or alternately at the rate of said pulses whereby said echoes are received either in both of said antennae simultaneously or first in one antenna and then in another, a viewing screen, means to indicate said echoes received in one of said antennae at a position on said screen corresponding to the time of their reception, and means to indicate the echo received in another of said antennae as an enlargement of said first mentioned indication at the same position when received simultaneously with the echo producing said first mentioned indication or in a position beside said first mentioned indication when received alternately with the echo producing said first mentioned indication.

7. The combination, in a radio echo apparatus, of means to generate a pulse wave having a predetermined frequency and a pulse wave having half of said frequency, a pair of receiving antennae, means to radiate pulses at the frequency of said first pulse wave, means to render said receiving antennae alternately operative to receive echoes of said pulses at said half frequency, a cathode ray device having a viewing screen, means to sweep the ray of said device across said screen at said predetermined frequency and to control said ray during alternate sweeps by echoes received in the corresponding one of said antennae, means to combine said pulse waves to produce a third wave, said third wave having zero value during said alternate sweeps and a finite value during the intermediate sweeps, and means to control said sweeps in accordance with said zero and finite values, thereby to spread apart indications produced on said screens by echoes received in different of said antennae.

8. In combination, a cathode ray device having a viewing screen, a source of square waves, means to deflect the ray of said device across said screen during each portion of said square wave of like sign, means to produce a square wave having half the frequency of said first mentioned square wave and having reversals of sign which are substantially coincident with alternate reversals of sign of said first mentioned square wave, means to combine said square waves to produce a resultant wave having alternate periods of zero value and finite value, said periods of zero value occurring during alternate sweeps of said ray and said periods of finite value occurring during sweeps of said ray intermediate said alternate sweeps, and means to supply said resultant wave to said deflection means to control the deflection of said ray in accordance with the value of said resultant wave during said alternate periods.

9. In combination, a cathode ray device having a viewing screen, means to produce a square wave, means to generate a sawtooth wave from said square wave and to deflect the ray of said device across said screen in accordance therewith, means to produce a second square wave, means to combine said square waves, said waves being of such character that a resultant wave is produced having zero value during alternate deflections of said ray across said screen and having finite value during deflections of said ray intermediate said alternate deflections, and means to superpose said resultant wave upon said sawtooth wave and to control the deflection of said ray in accordance with the resultant thereof.

10. In combination, means for producing two square waves with coincidentally occurring zero values and one having a frequency twice that of the other, a pulse radiator and a pair of pulse receivers, means to synchronize the pulses radiated by said radiator with said wave of higher frequency and to render said receivers alternately operative to receive echoes of the radiated pulses at the frequency of the lower frequency wave, a cathode ray device having a viewing screen, means to generate a sawtooth wave from said wave of higher frequency and to sweep the ray of said device across said screen in accordance with periods of sawtooth wave of like variation, means to combine said two square waves to produce a resultant wave and to superpose said resultant wave on said sawtooth wave in phase to vary the position of alternate sweeps of said ray across said screen while the position of intermediate sweeps is unaffected, and means to control said ray during said alternate sweeps by pulses received in one of said receivers and during said unaffected sweeps by pulses received in the other receiver.

11. In combination, a cathode ray device having a viewing screen, means to transmit recurrent radio pulses, two directive antennae oriented in the direction in which said pulses are transmitted to receive echoes thereof from the same remote objects, means to deflect the ray of said device over said screen during a predetermined interval after each transmitted pulse and to modulate said ray during said interval by any echo pulses received in said antennae whereby the echoes received from the same object in both antennae produce additive effects at the same point on said screen, means to render said antennae alternately effective, and means to indicate echoes received in one of said antennae at the same point on said screen and to indicate echoes received in the other antenna at a different point on said screen whereby the effect of said pulses are not additive on said screen and the range to the object producing said echo may be continuously determined by the position of said first point on said screen.

CHARLES S. ROOT.

REFERENCES CITED

The following references are of record in the file of this patent:

UNITED STATES PATENTS

| Number | Name | Date |
|---|---|---|
| 2,143,035 | Smith | Jan. 10, 1939 |
| 2,189,549 | Hershberger | Feb. 6, 1940 |
| 2,300,189 | Wolff | Oct. 27, 1942 |
| 2,312,203 | Wallace | Feb. 23, 1943 |